United States Patent [19]

Sobajima et al.

[11] 3,847,659
[45] Nov. 12, 1974

[54] PROCESS FOR PRODUCING PLASTIC ARTICLES HAVING TRANSPARENT ELECTROCONDUCTIVE COATINGS

[75] Inventors: Shigenobu Sobajima; Norio Takagi; Kiyoshi Chiba, all of Tokyo, Japan

[73] Assignee: Teijin Limited, Osaka, Japan

[22] Filed: Nov. 7, 1972

[21] Appl. No.: 304,482

[30] Foreign Application Priority Data
Nov. 13, 1971 Japan.................................. 46-90770

[52] U.S. Cl..................... 117/211, 117/7, 117/62, 117/106 R, 117/213, 204/56 R
[51] Int. Cl. ..................... H05b 33/23, C23c 11/00
[58] Field of Search........... 117/211, 106 R, 62, 213, 117/7; 204/56 R

[56] References Cited
UNITED STATES PATENTS

| | | | |
|---|---|---|---|
| 3,756,847 | 9/1973 | Leibowitz...................... | 117/106 R |
| 3,749,658 | 7/1973 | Vossen............................... | 117/211 |
| 3,695,910 | 10/1972 | Louderback..................... | 117/106 R |
| 3,505,092 | 4/1970 | Ryan............................... | 117/106 R |
| 3,458,342 | 7/1969 | Cormia........................... | 117/106 R |
| 3,400,014 | 9/1968 | Blumberg......................... | 117/106 R |
| 3,356,529 | 12/1967 | Kiser................................ | 117/211 |

OTHER PUBLICATIONS
Holland, Vacuum Deposition of Thin Films, John Wiley & Son, N.Y., Pg. XI (1956).

Primary Examiner—Leon D. Rosdol
Assistant Examiner—Michael F. Esposito
Attorney, Agent, or Firm—Sherman & Shalloway

[57] ABSTRACT

A method for preparing a transparent electrically conductive article which is characterized by forming a coating on the surface of a plastic material by vacuum evaporation using indic oxide as an evaporating source at a pressure lower than $5 \times 10^{-4}$ mmHg while maintaining the temperature of the evaporating source at 1,300° to 2,000°C., and thereafter subjecting said coating to an oxidation treatment.

15 Claims, No Drawings

PROCESS FOR PRODUCING PLASTIC ARTICLES HAVING TRANSPARENT ELECTROCONDUCTIVE COATINGS

This invention relates to plastic articles having a transparent electroconductive coating and to a process for producing them. More specifically, it relates to a process for producing a shaped plastic article having a transparent coating on its surface by forming a coating under high vacuum on the surface of a shaped plastic article under specified conditions using indic oxide, i.e. indium (III) oxide, as an evaporating source and then subjecting the article to oxidation. The shaped articles according to the present invention have an excellent transparency, electric conductivity, flexibility, impact strength, processability and continuous producibility, and find utility as transparent electrodes in a solid display and electroluminescence, panel heater, base supports of opto-electronic materials and recording materials, and antistatic plastics.

With the advent of the "informationalized society," cathode ray tubes which have been previously used exclusively have been superseded by solid displays such as an electro-luminescence display, liquid crystal display, plasma display or ferroelectric display. Such solid displays require transparent electrodes. Furthermore, opto-electric devices and recording materials utilizing the mutual action and mutual conversion of electrical and optical signals are about to come under the spotlights as a leading player in the information processing technique, spotlight materials having a combination of superior transparency, electroconductivity and flexibility have been demanded for use as component parts of these opto-electric materials. Elsewhere, materials having excellent transparency, electric conductivity and impact strength are desired for use as antifreezing window panes in traffic conveniences such as automobiles or airplanes. On the other hand, the buildup of static charge on shaped plastics often becomes a cause of serious accidents. However, the method of static prevention by incorporation of metal or carbon powders is often not desirable because it involves coloration, opacification and deteriortion of dynamic properties of the shaped plastics. The formation of a transparent electroconductive coating on the surface of the shaped plastics is also excellent as a method of static prevention.

The transparent electrically conducting material which has mainly been used is, for example, NESA-glass, produced by forming a coating of tin oxide on a thermally stable material such as glass or quartz. The materials based on glass or quartz bone defects of flexibility (therefore, cannot be produced continuously), poor processability, low impact strength, heavy weight, and high dielectric-loss. Furthermore, because they cannot be wound up as in the case of magnetic tapes or photographic films, they are difficult to use as information recording media. Such defects can be almost completely removed by employing polymeric supports (bases) on which transparent electronductive coatings are formed. But as the polymeric materials generally have poor thermal stability, the conventional methods of preparing them are hardly applicable.

The method of producing NESA-glass comprises spraying an aqueous hydrochloric acid solution or alcohol solution of tin chloride onto a glass plate heated at 450° – 600°C. to hydrolyze tin chloride instantaneously on the glass plate. However, plastic materials which are substantially colorless and transparent and have excellent mechanical properties are stable at temperatures below 300°C. As examples of a method of forming an electroconductive coating on such plastic materials as polyester films, there can be cited the following:

1. Method comprising depositing indium metal by cathode sputtering or vacuum evaporation, followed by heat-treatment of the formed coating of indium metal in air at 160°C. and further treatment with nitric acid, for example, to convert it to indium oxide.
2. Method comprising vacuum evaporation in oxygen at low pressures using indium metal as an evaporation source or further heat-treating the coating thereby to form a coating of indium oxide.

It is known that the coating of tin oxide or indium oxide are suitable as good transparent electroconductive coatings. Heretofore, metal indium has been used as a starting material in the formation of a coating of indium oxide.

The coating formed by sputtering or vacuum evaporation in the method (1) mentioned above is non-transparent and consists essentially of metallic indium. Since it is considerably difficult to convert metallic indium to its oxide at relatively low temperatures, even when the coating is heat-treated in air under mild temperature conditions which do not affect the base plastics adversely, substantial oxidation of metallic indium is not performed. Accordingly, a transparent coating of indium oxide cannot be obtained. For this reason, this method requires an additional step of treating the coating with nitric acid.

Method (2) mentioned above in which vacuum evaporation is performed in the presence of oxygen at low pressures using metallic indium as an evaporating source is based on the technical concept that a coating of indium oxide is formed by the reaction of the evaporated metallic indium with the oxygen. Since this vacuum evaporation is performed while involving the reaction of metallic indium with oxygen, it is called "reactive vacuum evaporation" or "reactive deposition." This method has the following defects.

Firstly, the rate of forming a coating by vacuum evaporation is low, and the structure of the coated layer is coarse, which results in low strength of bonding to the base material. This is due to the fact that because of the presence of oxygen the mean free path L of the evaporated particles is small. Secondly, it is very difficult in actual operation to perform a continuous vacuum evaporation operation while maintaining a partial oxygen pressure constant. If the partial oxygen pressure fluctuates, the uniformity of the resulting coating is lost. Therefore, from a commercial point of view, it is substantially impossible to form a uniform, stable transparent electroconductive coating on the surface of the base material while continuously moving the base material.

We have noted a report by J. W. Mellor in A Comprehensive Treatise on Inorganic & Theoretical Chemistry describing that freshly prepared indium oxide is more sublimable than indium oxide prepared previously. We have made attempts to form such freshly prepared indium oxide by heating indium metal in a tungsten crucible equipped in a vacuum evaporation apparatus. Since tungsten is oxidized at temperatures higher than 530°C. to form sublimable tungsten oxide, the tungsten crucible with indium metal in it was heated to temperatures below 530°C. in an atmosphere of circulated oxygen. However, the oxidation was very slow and it was extremely difficult to oxidize indium metal substantially. When the crucible was heated to about 900°C. in order to promote the oxidation of indium metal, the indium metal was partially oxidized and, at the same time, the tungsten crucible was highly oxidized. Vacuum evaporation was then carried out at reduced pressure of $5 \times 10^{-4}$ mmHg, whereby dull coatings containing a large quantity of tungsten oxide were obtained. Even when the coatings were subsequently heat-treated in an oxidizing atmosphere, it was substantially impossible to obtain a transparent electroconductive coating.

According to the present invention, a new method free from the various defects of the prior art has now been found.

The process of the present invention comprises forming a coating on the surface of a shaped plastics by vacuum evaporation using indic oxide as an evaporating source at a pressure lower than $5 \times 10^{-4}$ mmHg and an evaporant temperature of 1,300° to 2,000°C., and thereafter subjecting said coating to an oxidation treatment.

The special features and advantages of the new process of the present invention are as follows:

1. A first feature is to use indic oxide as an evaporating source. A greater part of the indic oxide is decomposed in the course of evaporation to indium oxides of the lower oxidation state than indic oxide, and deposits on the surface of a base material to form a coating. The lower oxides of indium may be expressed by $In_xO_y$ wherein $0<y/x<1.5$. The decomposition of indic oxide vacuum-evaporated by being heated to high temperatures to the lower oxides is the same phenomenon as is observed generally in other metal oxides. This will be understood from the fact that the coating formed assumes a gray to black color which is the color of the lower oxides of indium. The lower oxides are electrically conductive but not transparent. These lower oxides can be far more easily oxidizable to indic oxide than metallic indium. In other words, in the vacuum evaporation step followed by the oxidation treatment, coatings comprising the lower oxides are oxidized under far milder conditions and within shorter periods of time than coatings of metallic indium or those containing both metallic indium and oxygen which are formed by the conventional methods. For example, by heating the coating in an oxidizing atmosphere at a relatively low temperature of from 80° to 250°C. for a considerably short period of time, the desired transparent coating of indic oxide can be obtained. Thus, the process of the present invention has the advantage that it can be applied to a plastic base and a high productivity is expected.

2. A second feature of the process of the present invention is to perform vacuum evaporation at a pressure lower than $5 \times 10^{-4}$ mmHg. Since introduction of oxygen is not necessary as in the conventional reactive deposition process, there is no difficulty of maintaining the oxygen pressure constant but it is possible to maintain the vacuum deposition system at such a low pressure. Low pressures serve to increase the rate of deposition and to form a coating which is uniform and has high adhesion. Generally speaking, if the relation $L>l$ is not established between the mean free path L of the evaporated particles and the distance $l$ between the base material and the evaporating source in vacuum evaportion, the rate of deposition is extremely low and the structure of the coating formed becames non-uniform. The mean free path L depends upon the degree of vacuum, and is, for example, about 5 cm at $1 \times 10^{-3}$ mmHg, about 10 cm at $5 \times 10^{-4}$ mmHg, about 25 cm at $2 \times 10^{-4}$ mmHg, and about 50 cm at $1 \times 10^{-4}$ mmHg. Since the introduction of oxygen is not required in the present invention, lower pressures than $5 \times 10^{-4}$ mmHg can be applied. If the pressure is high, the distance $l$ between the evaporating source and the base material must be made smaller in order to maintain the relation $L>l$. For example, since L at $1 \times 10^{-3}$ mmHg is about 5 cm, it is necessary to maintain the distance $l$ between the evaporating source and the base material at below 5 cm. As a result, the plastic base is likely to be softened or melted by the heat of irradiation from the source of evaporation. The present invention is free from such likelihood and has the advantage that a transparent electroconductive coating of good quality can be formed at a far higher rate of production than in the conventional methods.

The preferred embodiments of the present invention will be more specifically described below.

The present invention can be applied to almost all synthetic plastics generally available. The conditions employed throughout the entire process of the present invention are mild enough to apply it to plastics, and moreover such conditions can lead to the formation of a transparent electroconductive coating of good quality on the surface of plastics. Typical examples of the plastics are thermoplastic polymers such as polyolefins or vinyl polymer, e.g. polypropylene, poly(methyl methacrylate) or polystyrene, aromatic polyesters such as polyethylene terephthalate, polyethylene naphthalate or polymers derived from bisphenol A and its halides and acid dichlorides, polyamides such as poly-ϵ-caproamide, poly-γ-butyroamide, polyhexamethylene adipamide, poly-m-phenylene isophthalamide or a copolycondensate of m-phenylenediamine and isophthalic acid and terephthalic acid, polyimides, polyamideimides, polybenzimidazoles, and polycarbonates; and thermosetting polymers such as unsaturated polyester resins, epoxy resins, allyl resins, melamine resins, phenol resins, or urea resins. Of these, polyester resins, especially polyethylene naphthalate, are preferred as a base material because of their superior heat resistance, weatherability, transparency and other properties. This will be described in greater detail below. It is desirable that the plastics to be used in this invention should not contain a plasticizer which is easily volatilizable at the reduced pressures to be employed in the vacuum evaporation step in accordance with the present invention.

The form of the shaped plastics may be a film, sheet, plate or blocks produced by injection molding or extrusion molding, etc. Where it is to be used as a transparent electrode for solid displays, the plastics should preferably be in the form of a transparent film or sheet. But when it is used for static prevention or as a panel heater, colored or non-transparent plates or blocks may be used. In this case, too, the transparent indium oxide coating in accordance with the present invention is desirable since it does not impair the color or design of the base plastics. The film or sheet, as referred to above, has a thickness of about 5 microns to about 10 mm.

The evaporation source used in the vacuum evaporation step of the present invention is indic oxide. Indic oxide is commercially available, or can be synthesized from indic halides. No example has been known previously in which a transparent electroconductive coating is formed on the surface of a shaped plastics using indic oxide as an evaporation source. The evaporation source may further contain minor amounts of ingredients which do not hinder the transparency or electric conductivity of the coating finally formed. For example, it may contain less than about 20 percent by weight, based on the total weight of the evaporation source, of tin oxide or lower oxides of indium, in addition to the indic oxide.

The evaporation source must be maintained at a temperature of 1,300°C. or above. The upper limit of the temperature of the evaporation source is not particularly set out, but usually 2,000°C. At temperatures lower than 1,300°C., the rate of evaporation is slow, and it is not commercially advantageous. The especially preferred range of temperature is 1450 to 1,800°C.

The following comparative test shows that if the temperature of the evaporation source is lower than 1,300°C., the rate of vacuum evaporation is very slow.

A coating was formed on a biaxially drawn film of polyethylene terephthalate by vacuum evaporation using 99 percent indic oxide as an evaporation source at $1.2 \times 10^{-4}$ mmHg. An alumina-coated tungsten basket was used as a heating element, and the distance $l$ between the evaporation source and the base material was maintained at 8 cm ($l$ was made smaller in order to facilitate the measurement of the rate of evaporation at low temperatures). The results obtained are tabulated below.

| Temperature of the evaporation source (°C) | 1130 | 1190 | 1260 | 1310 | 1460 | 1550 |
|---|---|---|---|---|---|---|
| Rate of evaporation (A/sec.) | <0.1 | <0.1 | 0.5 | 4.5 | 15 | 22 |

Heating of the evaporation source may be effected, for example, by electric resistance heating, high frequency induction heating or electron beam heating. If a tungsten filament is used in the electric resistance heating, indium and tungsten form a low melting alloy, and the resulting coating contains tungsten or tungsten oxide which greatly impairs the electric conductivity and transparency of the coating, or the properties change greatly with the passage of time. The amount of tungsten oxide increases with higher pressures at which the vacuum evaporation is performed. Accordingly, the present invention is performed at very low pressures. Where a tungsten filament is used as a heating element, it is desirable to coat it with alumina or beryllium oxide.

The vacuum evaporation is carried out at a pressure lower than $5 \times 10^{-4}$ mmHg (Torr.), preferably from $2 \times 10^{-4}$ to $1 \times 10^{-7}$ Torr. As previously stated, since the introduction of oxygen is not necessary in the present invention, such high vacuum can be applied, and thereby a coating which is uniform and has high adhesion force can be formed at a very high evaporation rate.

The outstanding difference in effect between the pressures lower than $5 \times 10^{-4}$ Torr and those higher than it is clearly shown by the following experiment.

A coating was formed on a biaxially oriented film of polyethylene terephthalate by vacuum evaporation using 99 percent indic oxide as an evaporation source at a temperature of 1,450°C. under the pressure indicated below. An alumina-coated tungsten basket was used as a heating element and the distance $l$ between the evaporation source and the base material was maintained at 15 cm. The results were as follows:

| Degree of vacuum (mm Hg) | Mean free path L (centimeters) | Rate of evaporation | Crosscut test* |
|---|---|---|---|
| $2 \times 10^{-4}$ | 25 | 5 A/sec. | 100% |
| $8 \times 10^{-4}$ | 6.25 | 0.6 A/sec. | 72% |

\* The crosscuts test is a test for adherence in which corsscuts (10 × 10) are provided at intervals of 1 mm only on the surface of the indium oxide coating, an adhesive tape is applied onto the crosscut surface and when the tape is removed, the number of remaining crosscuts is measured. This crosscut test was performed after subjecting the deposited coating to an oxidation treatment.

Since the mean free path L of the evaporated particles increases with lower pressures, it is also possible to maintain the distance $l$ between the plastic base and the evaporation source sufficient for not softening the plastic base by the heat of irradiation from the evaporation source.

The rate of formation of the coating by vacuum evaporation differs according to the temperature of the evaporation source, the degree of pressure reduction and the distance between the evaporation source and the base material. According to the present invention, unlike the conventional reactive deposition process involving the reaction between metallic indium and oxygen in the course of evaporation, coatings of similar properties can be formed irrespective of whether the rate of formation of the coating thickness is relatively slow, e.g. 2–5 A./sec or as fast as more than 50 A./sec. Thus, the present electroconductive has the advantage that the process can be performed commercially at high speed.

Thus, there can be formed a coating of any desired thickness at high speed, such as a coating of a thickness from 100 A to 3,000 A. The most preferred thickness is from 300 to 2,000 A.

If the coating is excessively thin, its electric properties are unstable or the coating has imperfections. On the other hand, if the thickness is too large, it is difficult to provide a transparent coating by subsequent oxidation, especially heating oxidation, of the coating deep into its inside. The thickness of the coating in the above specified range is especially important when the base is a plastic film, because in the above-mentioned range, the flexibility of the film is not impaired, and the adherence of the coating to the film is great.

The temperature of the base plastics is elevated to some extent during vacuum evaporation by the heat of irradiation from the evaporation source and the heating element. For example, in electric resistance heating or high frequency induction heating, the temperature of the base plastics may reach 150°C. or higher. In the case of electron beam heating, the temperature of the base material can be maintained at about 60°C. Furthermore, by forcibly cooling or heating the base material, the temperature can be suitably controlled. The temperature of the base material should of course be adjusted to below the heat-resistance temperature of the shaped plastics. By the heat-resistance temperature is meant the maximum temperature at which the shaped plastics does not undergo substantial deformation by heat. For example, in the case of plastics in the form of a film or sheet, this temperature means the maximum temperature at which the plastics does not undergo creases due to thermal strain or cracks due to thermal shrinkage when heated under a constant length biaxially. Although this temperature differs according to the fine texture of the material and hence the drawing and heat-treating conditions, it is 210° – 220°C. for a biaxially drawn film of polyethylene terephthalate, 240° – 250°C. for a biaxially drawn polyethylene naphthalate film, 130° – 140°C. for a plate of polymethyl methacrylate and 140° – 160°C. for a shaped article of polycarbonate. The heat-resistance temperature can be known simply by setting a test piece under a constant length, heating it in a constant temperature vessel in this state at a rate of 2°C./min. and detect the maximum temperature at which there is visually no formation of creases and cracks or extreme coloration.

In order to improve the adhesion between the resulting coating and the plastics base, a primer may be formed on the surface of the base material. The primer should be chosen so that it should not leave a volatile material in order to achieve a high degree of vacuum in the step of vacuum evaporation, it should have heat resistance at temperature used in the oxidation treatment, and it should have transparency which does not impair the properties of the transparent electrically conductive coating. For example, a coating agent comprising a silicone resin or epoxy resin is a preferred primer material.

It is desirable that the surface of the shaped plastics should be washed before the coating of a primer. The washing of the surface may be carried out, for example, by ultrasonic vibration in an organic solvent such as carbon tetrachloride or acetone. It is also possible to impart ion bombardment to shaped plastics, or treat it with a mixed bichromic acid solution or with an oxidizing flame.

The vacuum evaporating apparatus may be of the bell jar type for laboratory use, but for commercial practice, a continuous vacuum evaporating apparatus or an apparatus including a rotary sample stand is preferred. Especially when the base material can be wound up in roll form, such as films or sheets, it is convenient to use a continuous apparatus in which a feed roll and a take-up roll are provided in a vacuum chamber.

The coating formed on the surface of the base material by the vacuum evaporation process in accordance with the present invention consists of mainly lower oxides of indium formed during the process of evaporation of indic oxide. The oxides are converted to the desired transparent indic oxide by oxidation treatment under mild conditions. By the "oxidation treatment," as used in the present specification and claims is meant a treatment by which a coating consisting mainly of the lower oxides of indium formed on the surface of the base material by vacuum evaporation is subjected to oxidizing conditions to convert the lower oxides substantially to indic oxide. It has been found that the oxidation treatment may be carried out by heating the coating in an oxidizing atmosphere, subjecting the coating to anodic oxidation, or contacting the coating with an aqueous solution containing an oxidant. These methods will be described below in greater detail.

First the method of heating the coating in an oxidizing atmosphere will be described with reference to a preferred embodiment.

The oxidizing atmosphere is an atmosphere required for oxidation which is air or oxygen gas or one obtained by activating air or oxygen by ultraviolet ray radiation or discharge. Those containing at least 15 percent by volume of oxygen are preferred. Generally, with increasing amounts of oxygen gas and with increasing degree of activation, the temperature necessary for oxidation may be lower and the time may be shorter.

It has been found as a result of experiments of the inventors that the relation between the heating temperature $T$ (°K) in air at 1 atmosphere required to increase the transmission of the light of 600 nm (nanometers) through a coating of the lower oxides of indium having a thickness of 800 A. to at least 80 percent and the treating time $t$ (minutes) is expressed by the following empirical formula:

$$t = 3.0 \times 10^{-10}\, e\, 1.65 \times 10^{-12}/k^T$$

Wherein
  $k$ is the Boltzmann's constant [$1.3 \times 10^{-16}$ erg/degree],
  $e$ is the base of natural logarithm, and T is 400° – 550° K. This means that with higher temperatures, the time required becomes shorter. From this equation, it can be seen that the oxidation treatment may be carried out, for example, at 200°C. for about 30 minutes.

If the atmosphere is pure oxygen, the conditions are much milder, and for example, the oxidation treatment can be carried out at 150°C. for 20 minutes.

In order to carry out the oxidation treatment at a feasible velocity, it is preferred to employ heating temperatures of above about 80°C. Of course, the heating temperature should be lower than the heat-resistance temperature of the base plastics. Since the heat-resistance differs according to the type of the plastics used, it can be elevated depending upon the base material to be used. Suitable oxidizing conditions for several plastics are determined as follows in consideration of the heat-resistance temperature of the base material and the rate of the oxidation treatment.

According to the present invention, the maximum temperature during the production process can be adjusted to below 250°C. and below 200°C. by the deposition step in high vacuum and the oxidation treatment in an oxidizing atmosphere. By a combination of these steps, it has become possible to produce a transparent electroconductive coating of very desirable properties at a high rate of evaporation. According to the process of the present invention, a transparent electroconductive coating having a specific resistance of $10^{-2}$ to $10^{-4}$

| Polymers | Heat treatment in oxygen gas | | Heat treatment in air | |
| --- | --- | --- | --- | --- |
| | Temp. (°C) | Time (minutes) | Temp. (°C) | Time (minutes) |
| Polycarbonate | 130–140 | 60–180 | | |
| Polypropylene | 130–140 | 60–180 | | |
| Poly-ε-caproamide | 150–170 | 10–60 | | |
| Polyethylene terephthalate | 180–200 | 5–30 | 200–230 | 15–180 |
| Polyethylene naphthalate | 180–230 | 1–30 | 200–250 | 5–180 | ohm.cm and a transmission of 600 nm light of 60 – 95 percent can easily formed on the surface of shaped plastics.

Another embodiment of the oxidation treatment comprises subjecting the coating formed by vacuum evaporation to anodic oxidation. The anodic oxidation technique itself is well known, and is not considered to require any detailed description. Briefly stated, the anodic oxidation is carried out using an electrically conducting liquid medium in an electrolytic cell in which the coating formed by vacuum evaporation is used as an anode and a metal such as copper, aluminum, iron, tantalum, platinum or graphite is used as a cathode, and electrode potential is applied between the electrodes to an extent such that the lower oxides of indium which constitute the coating are oxidized. By the control of electricity being consumed at the anode, the coating changes into a transparent electroconductive coating, and there can be obtained a shaped plastic having a coating with the desired electric conductivity and transparency.

The liquid medium used for the anodic oxidation in accordance with this invention may be any medium which advances anodic oxidation, but those having a specific conductivity of $10^{-10}$ ohm$^{-1}$.cm$^{-1}$ to $10^{-2}$ ohm$^{-1}$.cm$^{-1}$, especially $10^{-9}$ ohm$^{-1}$.cm$^{-1}$ to $10^{-3}$ ohm$^{-1}$.cm$^{-1}$ are preferred. Examples are as follows:

1. water,
2. an aqueous solution of an inorganic acid such as hydrochloric acid, sulfuric acid, nitric acid, boric acid or phosphoric acid, preferably sulfuric acid, nitric acid and boric acid,
3. an aqueous solution of an organic acid such as acetic acid, oxalic acid, tartaric acid, citric acid or succinic acid, preferably tartaric acid and succinic acid,
4. an aqueous solution of an inorganic or organic acid salt, preferably ammonium borate, potassium hydrogen sulfate, ammonium sulfate and sodium tartrate,
5. alcohols such as methanol, ethanol or glycerol, phenols such as phenol, naphthol, hydroguinone or anthraquinone, ketones such as acetone, methyl ethyl ketone or methyl isobutyl ketone, esters such as ethyl acetate, ethyl propionate or ethyl butyrate, ethers such as dimethyl ether, diethyl ether or methyl ethyl ether, amides such as dimethyl formamide, dimethyl acetamide, pyrrolidone or N-methylpyrrolidone, nitriles such as acetonitrile, propionitrile or benzonitrile, nitro compounds such as nitrobenzene or nitronaphthalene, dimethyl sulfoxide, butyrolactone; preferably methanol, butyrolactone, acetonitrile, dimethyl formamide and dimethyl sulfoxide, and
6. an aqueous solution of the organic compound listed in (5), preferably methanol, butyrolactone, acetonitrile, dimethyl formamide or dimethyl sulfoxide.

These media can be used in mixture, and especially dimethyl formamide and dimethyl sulfoxide have proved to be very suitable for use in the present invention.

This anodic oxidation method is advantageous in that it can be performed continuously at room temperature, and can be applied to plastics having a relatively low thermal stability. Since this method can be performed under milder conditions than in the conventional method, a uniform product can be obtained easily. By controlling the amount of electricity required for anodic oxidation, there can be produced a coating of the desired electric conductivity and transparency, and the properties of the coating can thus be automatically controlled.

Another embodiment of the oxidation treatment involves contacting the coating with a solution containing an oxidizing agent. Since the coating consists essentially of the lower oxides of indium, they can be easily oxidized to indic oxide, unlike metallic indium.

The type of the oxidizing agent to be used is not particularly restricted, and customary oxidizing inorganic chemicals are preferably used. Specific examples include permanganic acid salts, bichromic acid and its salts, persulfuric acid and its salts, hydrohalic acids and their salts, perhydrohalic acids and their salts, hydrogen peroxide, cerium sulfate, and ferric chloride. Especially, permanganates, bichromates and persulfates are suitable.

The oxidizing agent is used as a solution in water, acetic acid, dimethyl formamide, etc. The oxidizing power of the oxidizing agent may be increased by heating the solution at the time of oxidation, or in the case of permanganates or bichromates, by adding an acid such as dilute sulfuric acid or an alkali such as sodium hydroxide. The concentration of the oxidizing agent in the solution differs according to the type of the oxidizing agent, and in the case of permanganates or bichromates for example, it is 2 – 3 percent by weight. In the case of persulfates, the concentration is about 10 percent. The suitable concentration for aqueous hydrogen peroxide is about 30 percent. Where the oxidizing action of the oxidizing agent is strengthened by adding a dilute sulfuric acid or sodium hydroxide, it is preferred to adjust the amount of the acid or alkali so that the pH of the solution becomes 1 – 13, preferably 2 – 12.

The shaped plastics on which surface is formed a coating of the lower oxides of indium is immersed in a solution containing the oxidizing agent to oxidize the coating chemically. It is sufficient that the immersion time is several seconds at room temperature when a solution of potassium permanganate or potassium bichromate acidified with sulfuric acid is employed. When an aqueous solution of persulfuric acid is used, the immersion time should be about 30 minutes.

The oxidation treatment using the oxidizing agent-containing solution can be performed at room temperature, or if desired, by mild heating. Therefore, the heat resistance of the plastic base need not to be considered in performing the oxidation treatment. Furthermore, since this oxidation treatment is based on chemical oxidation with an oxidizing agent under mild conditions, a uniform, transparent electroconductive coating can be produced with a very simple operation. Such a method has not been known previously.

By the vacuum evaporation step and the oxidation treatment step described above, a transparent electroconductive coating can be formed on the surface of shaped plastics. However, in certain cases, it is desired to improve the transparency of the coating further. For example, when the thickness of the coating is large and the effect of the oxidation treatment does not extend to the interior of the coated layer, or when oxidation is not sufficiently performed in order to shorten the oxidation treatment time or to make the conditions mild, or when there is a local fluctuation in the thickness of the coating due to vacuum evaporation on to a base material having a wide area, the oxidized coating might have insufficient transparency or non-uniform transparency. The insufficient transparency is attributed to the fact that some amounts of the lower oxides of indium still exist. A new method of improving the transparency of the coating further in such a case has now been discovered, which involves chlorinating the coating. This is based on the fact that the reactivity for chlorinatin of indic oxides differs from that of the lower oxides of indium, and while the former is difficult to chlorinate, the latter is easily chlorinated to a water-soluble chloride and can be removed from the coating.

The chlorinating agent may be gaseous or liquid, and is not particularly restricted. Usually, chlorine, hydrogen chloride, nitrogen oxychloride, hydrochloric acid, and diluted aqua regia are used. Diluted hydrochloric acid is especially preferred. The chlorinating temperature is room temperature and if desired a slightly elevated temperature. The time required for chlorination differs according to the type and concentration of the chlorinating agent, the chlorinating temperature and the desired degree of transparency, but usually is about 3 seconds to about 30 minutes. The treated coating is washed with a solvent capable of dissolving the chloride, usually water, and dried.

As described above, the chlorination operation is very simple, and by performing this step after the oxidation treatment, it is possible to improve the transparency of the coating and the uniformity of the transparency. Hence, even when the oxidation is insufficient in the oxidation treatment step, there can be obtained a product having excellent transparency by performing this chlorination. In other words, by performing the chlorination treatment, the oxidation time required for obtaining transparency of the same level can be remarkably shortened, for example, to about half.

The plastics having a transparent electroconductive coating in accordance with this invention are electrically conductive while retaining the properties of the plastics, and unlike the conventional electroconductive rubbers or plastics containing the fine powders of metal or carbon, the coating can be made colorless and transparent. Therefore, the shaped plastics according to the present invention find a wide range of utility, for example, as transparent electrodes in solid displays for use as indicator plates of portable electronic computers or digital wrist watches, transparent electrodes for use in panel illumination, anti-freezing window panes laminated on glass, etc. in traffic facilities, plates for reflecting thermic rays, or electrodes for use in recording materials utilizing the mutual action of light and electricity such as electrophotographic recording materials, electrolytic recording materials or electron beam recording materials. For example, the shaped plastics should be in the form of a film when used as recording films, and also, they should be transparent and have excellent physical properties. Generally, polyimides have excellent thermal stability and dimensional stability, but inherently have the defect that they are colored and have a water absorbing ratio of 2 – 5 percent. Especially, the coloration is a fatal defect as a transparent electroconductive film. From this viewpoint, a polyester such as polyethylene terephthalate is preferably used as a base of a transparent electroconductive film.

Polyethylene terephthalate has transparency over a wide visible region and superior mechanical properties and dimensional stability at room tempeatures, and because of this, it is an excellent material as a base support of a transparent electroconductive film. However, it is still required to be improved in regard to dimensional stability at higher temperatures and resistance to heat degradation and to ultraviolet degradation. It has now been found that a transparent electroconductive film of outstanding quality can be provided by forming a coating of indic oxide on a film of polyethylene 2,6-naphthalenedicarboxylate. The polyethylene-2,6-naphthalenedicarboxylate is a polyester in which at least 80 mol percent of the recurring units is a polymer obtained by polycondensation of ethylene glycol and naphthalene-2,6-dicarboxylic acid or substantially the same polymer as this. The remainder of the recurring units is derived from another component copolymerized with the polymer. The other component may, for example, be an aromatic dicarboxylic acid such as terephthalic acid, isophthalic acid, phthalic acid, naphthalene-2,7-dicarboxylic acid, or diphenyldicarboxylic acid and/or a diol such as propylene glycol, trimethylene glycol, tetramethylene glycol, neopentyl glycol, p-xylene glycol, 1,4-cyclohexane dimethanol or hydrated bisphenol A. The polyethylene-2,6-naphthalenedicarboxylate may also be a blend consisting of at least 80 mol percent of a polymer obtained by polycondensation of ethylene glycol and naphthalene-2,6-dicarboxylic acid and the remainder of at least one polymer obtained by polycondensation of the above-mentioned dicarboxylic acid and glycol components. If desired, the polyester may contain a stabilizer such as phosphoric acid, phosphorous acid or their esters, or an additive such as finely divided silica or China clay.

It is especially preferred that this film be a biaxially stretched film. The biaxially stretched film is one obtained by stretching an unstretched film formed by melt shaping in at least two directions, usually in perpendicular directions (to be referred to as longitudinal stretching and transverse stretching). The film for use as a base material in the present invention may be any film which is stretched substantially both in the longitudinal and transverse directions, irrespective of whether the stretching is performed simultaneously in two directions, successively in two directions, or by a combination of these procedures. The stretch ratio is not particularly limited. In order not to cause unevenness in thickness due to the non-uniformity of stretching, the draw ratio in each of the transverse and longitudinal directions is at leat 2, and it is preferred that either longitudinally or transversely, the stretch ratio should exceed 2.5. By so doing (and by choosing a proper stretching temperature), it is possible to restrain the thickness unevenness within ±10 percent.

The superiority of a coated film structure comprising a base film of polyethylene-2,6-naphthalenedicarboxylate (to be abbreviated as PEN) and coating of indic oxide will be described below in general terms with reference to some illustrative showings.

a. Transparency

A transparent electrically conductive film having a coating of indic oxide formed on a base support of PEN exhibits good transparency expressed by a light transmission of 50 to 90 percent (including the base) in a visible region. Such a good transparency is due to the formation of the transparent electroconductive film in accordance with the present invention. The PEN film base has good transparency in a visible region same as a polyethylene terephthalate film, and has a superior transparency to a polyimide film as shown in the following table.

| Wavelengths of light (nm) | Light transmission of 50 μm-thick PEN film (%) | Light transmission of 50 μm-thick polyimide film |
|---|---|---|
| 380 | 5 | 0 |
| 400 | 68 | 0 |
| 500 | 80 | 10 |
| 600 | 85 | 78 |
| 700 | 86 | 75 | b. Dimensional stability

The transparent electroconductive PEN film shows excellent mechanical properties which are due mainly to the properties of the base support. The mechanical properties of the biaxially stretched PEN film will be compared with those of the conventional polyethylene-terephthalate (PET for short) film as shown in the following table.

formed thereon, distortion hardly occurs between the base and the coating.

c. Thermal stability

Since PEN has a glass transition temperature of 115°C., about 50°C. higher than that of PET, and also has high initial Young's modulus at high temperatures, it has superior thermal dimensional stability. For example, the biaxially stretched PEN film has a dry heat shrinkage in a free condition at 140°C. of not more than 1.0 percent, but the dry heat shrinkage of the biaxially stretched PET film under the same conditions is as high as 6.0 percent. Such a difference in thermal dimensional stability appears as a great difference in the area to which the film can be applied. According to the thermal stability classification in the electric industry, materials comprising PET film are of E grade, while those comprising PEN film are of F grade.

In addition to the stability as used at the temperatures described above, the resistance of the film to a soldering bath used at the time of connecting the film to an electric circuit also poses a problem. The PET film often shrinks considerably in a soldering bath at below 225°C., and becomes useless. PEN films of thermally stable grade having a high density (at least 1.355) which is obtained by heat-treating the stretched film at below 250°C. and then again heat-treated at above 260°C. can be soldered using a soldering bath at a temperature as high as 250°C.

The thermal stability of the base material determines also the easiness of the production of the transparent electroconductive film. As previously stated, when the coating formed by vacuum evaporation is heated in an oxidizing atmosphere, the heating time may be shorter as the heating temperature is higher, and a film of better transparency can be obtained. PEN can withstand such high temperatures, and therefore, transparent electroconductive films of better properties can be obtained at lower cost.

d. Weatherability

In applications where the transparent electroconductive film is used outdoors (for example, when used as a solar battery or a photoswitch), the weatherability of

| Mechanical properties | Direction of measurement | Biaxially stretched PEN film | | Biaxially stretched PET film | |
|---|---|---|---|---|---|
| | | Balanced film | Longitudinally oriented film | Balanced film | Longitudinally oriented film |
| Tensile Strength | MD | 2,650 | 3,650 | 2,150 | 3,100 |
| (Kg/cm$^2$) | TD | 2,250 | 2,400 | 2,000 | 2,000 |
| Initial Young's modulus | MD | 60,000 | 80,000 | 40,500 | 58,000 |
| (Kg/cm$^2$ at room temperature) | TD | 56,000 | 50,000 | 41,500 | 42,000 |
| Initial Young's modulus | MD | — | 36,000 | — | 15,000 |
| (Kg/cm$^2$ at 120°C) | TD | — | 25,000 | — | 10,000 |
| Initial Young's modulus | MD | — | 22,000 | — | 9,000 |
| (Kg/cm$^2$ at 140°C) | TD | — | 10,000 | — | 5,500 |

MD: machine direction, TD: transverse direction
Balanced film: the stretch ratios in both direction are substantially the same As is seen from the above table, the biaxially stretched film of PEN has better mechanical properties than the PET film which is said to have excellent dimensional stability. It especially has high initial Young's modulus, and when a coating of indic oxide is the film becomes a problem. When a PEN film and a PET film were respectively exposed to the irradiation of a Xenon lamp for 200 hours, and the ratio of deterioration of strength at breakage was measured before and after the irradiation, it was found that the former deteriorated by 5 percent, whereas the latter deteriorated by 50 percent.

The transparent electroconductive PEN film is a novel film having a balanced high level of mechanical, electrical, optical and thermal properties. If only the thermal properties, for example, are considered, transparent electroconductive films based on polyimide films are excellent, and if the optical properties alone are considered, those based on cellulose triacetate films are excellent. However, the transparent electroconductive films based on PEN have a balanced outstanding quality in regard to all of the properties mentioned above.

The following examples are given to illustrate the present invention.

EXAMPLE 1

A 80 μm thick film of polyethylene-2,6-dinaphthalate which had been biaxially stretched and heat-treated at 230°C. (the film had been pretreated by immersing in a mixed bichromic acid solution, washing it sufficiently with water and drying it) was set under constant length in a vacuum evaporation apparatus with the distance between an evaporation source and the base film being kept at 30 cm, and 99 percent indic oxide was set in an alumina-coated tungsten crucible, in which was heated at about 1,600°C, then vacuum evaporation was performed at a rate of 6 A./sec. under a pressure of $1 \times 10^{-4}$ mmHg.

The resulting coating consisted of the lower oxides of indium. It was black in color and had a thickness of 800 A., a surface resistance of 330 ohms/cm$^2$ and a transmission of light of 600 nm of 20 percent.

When the film having the coating of lower oxides of indium was heat-treated at 250°C. in air, the transparency of the coating increased with time, and when 10 minutes passed, the transmittance of the coating in a wavelength region from 400 nm to 700 nm reached 85 – 92 percent. (The transmittance of light was measured by setting the film before vacuum evaporation in a compensation light path.)

The surface resistance of the coating gradually decreased for the first 1 to 3 minutes, but increased after a lapse of 3 minutes. When the film was heat-treated in air at 250°C. for 5 minutes (the conditions chosen in consideration of the transparency and the electric conductivity), there was obtained a transparent electrically conductive coating having a transmittance at 600 nm of 87 percent and a surface resistance of 250 ohms/cm$^2$ (specific resistance of $2.0 \times 10^{-3}$ ohms.cm). This film was lighter in weight than the conventional Nesaglass, had good flexibility and processability (cutting, punching, etc.), and lent itself to easy handling.

EXAMPLE 2

Using the same apparatus as used in Example 1, the same polyethylene-2,6-dinaphthalate film as used in Example 1 was subjected to vacuum evaporation using 99 percent indic oxide as an evaporation source while maintaining the degree of vacuum at $1 \times 10^{-4}$ mmHg and the temperature of the heating element at 1,500°C. There was formed a black coating of the lower oxides of indium having a thickness of about 650 A. The film having the coating was heat-treated in air at 180°C., 200°C., and 230°C., respectively. The results are shown in Table 3 below.

Table 3

| Temp. | 180°C | | 200°C | | 230°C | |
|---|---|---|---|---|---|---|
| Properties<br>Time (minutes) | Transmittance at 600 nm (%) | Surface resistance (ohms/cm$^2$) | Transmittance at 600 nm (%) | Surface resistance (ohms/cm$^2$) | Transmittance at 600 nm (%) | Surface resistance ohms/cm$^2$ |
| 0 (before heat-treatment) | 31 | 730 | 30 | 720 | 31 | 730 |
| 5 | 62 | 220 | 70 | 560 | 89 | 960 |
| 15 | 75 | 610 | 82 | 760 | 92 | 1200 |
| 30 | 80 | 750 | 87 | 900 | | |
| 60 | 86 | 880 | 90 | 1100 | | |
| 120 | 89 | 900 | | | | |

EXAMPLE 3

A 100 μ thick polyethylene terephthalate film which had been biaxially stretched and heat-treated at 210°C. was pre-treated in the same was as in Example 1, and fixed at under constant length to a water-cooled cold plate, and 99 percent indic oxide was vacuum-evaporated by the same apparatus as used in Example 1. The degree of vacuum was $6 \times 10^{-5}$ mmHg; the temperature of the heating element was about 1,450°C.; and the rate of vacuum evaporation was 2 A./sec. The distance between the evaporating source and the base material was maintained at 35 cm. The resulting coating of the lower oxides of indium had a thickness of about 680 A., a surface resistance of 270 ohms/cm$^2$ and a transmittance at 600 nm of 22 percent.

When the polyethylene terephthalate film having the coating was heat-treated at 180°C. for 30 minutes on oxygen atmosphere, there was obtained a transparent electroconductive coating having a surface resistance of 650 ohms/cm$^2$ and a transmittance at 600 nm of about 78 percent.

EXAMPLE 4

The same polyethylene terephthalate film as used in Example 3 was subjected to vacuum evaporation under the same conditions as mentioned above to form a black film having deposited thereon a coating of the lower oxides of indium. This film was heat-treated in air and in oxygen gas respectively under the following conditions. The results obtained are shown in Table 4.

Table 4

| Atmosphere | In oxygen gas (1 atm.) | | | | In air | |
|---|---|---|---|---|---|---|
| Temp. | 150°C. | | 180°C. | | 210°C. | |
| Properties / Time (minutes) | Transmittance at 600 nm (%) | Surface resistance (ohms/cm$^2$) | Transmittance at 600 nm (%) | Surface resistance (ohms/cm$^2$) | Transmittance at 600 nm (%) | Surface resistance (ohms/cm$^2$) |
| 0 (before heat-treatment) | 24 | 500 | 25 | 510 | 24 | 500 |
| 5 | 32 | 420 | 60 | 560 | 32 | 430 |
| 15 | 41 | 380 | 70 | 650 | 52 | 400 |
| 30 | 48 | 360 | 77 | 850 | 65 | 360 |
| 60 | 58 | 420 | 83 | 1200 | 85 | 470 |
| 180 | 83 | 490 | | | | |

EXAMPLE 5

A 3 mm-thick sheet of poly(diallyl isophthalate) was washed by ultrasonic vibration in an acetone bath to make a base. Using the same apparatus as used in Example 1 the base sheet was subjected to vacuum evaporation at a pressure of 5 × 10$^{-4}$ mmHg and 99 percent indic oxide was evaporated at about 1,700°C. (a rate of 1.4 A./sec.) The distance between the evaporating source and the base was maintained at 20 cm. There was obtained a black coating having a thickness of about 1,250 A., a surface resistance of 420 ohms/cm$^2$ and a transmittance at 600 nm of about 17 percent. The sheet having the coating was heat-treated at 230°C. for 30 minutes in air to form a transparent electroconductive coating having a transmittance of 80 percent and a surface resistance of 210 ohms/cm$^2$ (specific resistance of 2.6 × 10$^{-3}$ ohm.cm).

EXAMPLE 6

Indic oxide powders containing 5 percent by weight of stannic oxide were formed into tablets at 100 Kg/cm$^2$ and 600°C. over 5 hours to form a vacuum evaporating sample. The tablets were deposited at 1 × 10$^{-4}$ mmHg on a polyethylene naphthalate film at a rate of about 13 A./sec. using an electron gun (model E, product of Nippon Electric Varian Co.). The distance between the evaporating source and the base material was maintained at 25 cm. There was obtained a black coating having a thickness of about 800 A., a surface resistance of 1,300 ohms/cm$^2$ and transmittance of 600 nm of 19 percent. This film was heat-treated for 40 minutes at 200°C. in air to form a transparent electroconductive film having a coating with a surface resistance of 190 ohms/cm$^2$ and a percent light transmission at 600 nm of 90 percent.

EXAMPLE 7

Vacuum evaporation was performed under the same conditions as in Example 6 using the same evaporating source, base film and apparatus as used in Example 6, except that the content of the stannic oxide was 10 percent by weight, the distance between the evaporating source and the base material and the degree of vacuum and the rate of vacuum evaporation were maintained respectively at 15 cm, 9 × 10$^{-5}$ mmHg and 42 A./sec. There was obtained a black coating having a thickness of about 550 A., a surface resistance of 1,700 ohms/cm$^2$ and a transmittance at 600 nm of 21 percent. The film having the coating so formed was heat-treated in air at 210°C. for 30 minutes to provide a transparent electroconductive coating having a transmittance at 600 nm of 94 percent and a surface resistance of 430 ohms/cm$^2$.

This means that even when the rate of vacuum evaporation is considerably high, substantially the same coating as in the case of low rates of vacuum evaporation can be obtained.

EXAMPLE 8

Vacuum evaporation was performed by substantially the same procedure as in Example 7 except that the degree of vacuum was about 5 × 10$^{-5}$ mmHg and the rate of vacuum evaporation was about 12 A./sec. The temperature of the base film was maintained at 60°C., 130°C. and 200°C., respectively. There was formed a coating having a thickness of about 500 A. The film having the coating so formed was heat-treated in air at 200°C. for 30 minutes, and the results obtained are shown in Table 5 below.

Table 5

| Temp. of the film | 60°C | | 130°C | | 200°C | |
|---|---|---|---|---|---|---|
| Properties | Transmittance at 600 nm (%) | Surface resistance (ohms/cm$^2$) | Transmittance at 600 nm (%) | Surface resistance (ohms/cm$^2$) | Transmittance at 600 nm (%) | Surface resistance (ohms/cm$^2$) |
| Before heat-treatment | 20 | 2100 | 37 | 720 | 52 | 410 |
| After heat-treatment | 91 | 420 | 90 | 360 | 93 | 380 |

EXAMPLE 9

A 50 μm thick polyethylene naphthalate film was biaxially stretched and heat-treated at 230°C. The film was set in a vacuum evaporating appratus under constant length. At a pressure of $1 \times 10^{-4}$ mmHg, 99 percent indic oxide placed in a crucible made of beryllium oxide was heated to about 1,600°C. by a tungsten filament and deposited on the film which was 30 cm apart from the evaporating source.

The resulting coating consisted of the lower oxides of indium, which was black in color and had a thickness of 1,200 A., a surface resistance of 450 ohms/cm$^2$ and a transmittance at 600 nm of about 20 percent.

Using this film having black electroconductive coating as an anode and a platinum plate as a cathode, the coating of the lower oxides of indium was subjected to anodic oxidation in various organic solvents at room temperature as an electrolyte under the various electrolytic conditions shown in Table 6. The results are shown in Table 6.

small amount of electricity (this means that the time required for the oxidation is short). Therefore, it is a new method for producing the transparent electroconductive coating.

EXAMPLE 10

99 percent indic oxide was vacuum deposited by an electron gun at a pressure of $2 \times 10^{-4}$ mmHg on the surface of a base sheet 3 mm thick of polycarbonate, polypropylene, polystyrene and poly(methyl methacrylate). The distance between the base sheet and the evaporating source was maintained at 23 cm.

The resulting coating consisted of the lower oxides of indium, and there was obtained a black electroconductive sheet having a coating thickness of 1,500 A., a surface resistance of 300 ohms/cm$^2$ and a percent light transmission at 600 nm of about 15 percent.

The coating of the lower oxides of indium was subjected to anodic oxidation under the various electrolytic conditions shown in Table 7 using the black electroconductive sheet as an anode and a tantalum metal

Table 6

| Solvent | Anodic oxidation conditions | | | Characteristics of the transparent electroconductive coating | |
|---|---|---|---|---|---|
| | Voltage of the cell (Volt) | Current density at the anode (mA/cm$^2$) | Amount of electricity used for oxidation (coulomb cm$^2$) | Surface resistance (ohms/cm$^2$) | Transmittance* (%) |
| Dimethyl sulfoxide | 160 | 0.55 | 0.03 | 1,000 | 85 – 92 |
| Dimethyl formamide | 100 | 0.50 | 0.04 | 2,500 | 85 – 92 |
| Acetonitrile | 60 | 0.55 | 0.04 | 15,000 | 85 – 92 |
| Methanol | 70 | 0.50 | 0.04 | 15,000 | 70 – 85 |

*The transmittance in a wavelength region of 400 nm to 700 nm by placing the film before vacuum evaporation in a compensation light path.

As shown in Table 6, the electrolytic oxidation in accordance with the present invention is carried out at room temperature at a low current density and with a plate as a cathode. There was obtained a shaped article having the trnsparent electroconductive coating described in Table 7.

Table 7

| Base | Anodic oxidation conditions | | | | Properties of the transparent electroconductive coating | |
|---|---|---|---|---|---|---|
| | Electrolyte | Voltage of the cell (volts) | Current density at the anode (mA/cm$^2$) | Amount of electricity used for oxidation (coulomb/cm$^2$) | Surface resistance (ohms/cm$^2$) | Transmittance (%) |
| Polycarbonate | Aqueous solution of sulfuric acid (pH=4.8) | 2.6 | 1.0 | 3.0 | 20,000 | 85 – 92 |
| Polystyrene | Aqueous solution of nitric acid (pH=2.5) | 2.0 | 0.1 | 0.04 | 3,500 | 70 – 80 |
| Poly(methyl methacrylate) | Aqueous solution of boric acid (0.05% by weight) | 6.5 | 0.7 | 0.6 | 5,000 | 60 – 70 |
| Polypropylene | Aqueous solution of tartaric acid (0.05% by weight) | 2.0 | 0.5 | 0.03 | 1,300 | 60 – 70 |

It is clearly seen from the results shown in Table 7 that by properly choosing the solvent in the anodic oxidation method in accordance with the present invention, a transparent electroconductive coating can be formed on the surface of ordinary versatile plastics having a relatively low heat resistance temperature.

Furthermore, unlike the process for producing the conventional Nesaglass, there is no evolution of corrosive hydrochloric gas during the manufacture of the transparent electroconductive coating. The transparent electroconductive coating can be formed under far milder conditions than in the heat decomposition method at high temperatures. Accordingly, this anodic oxidation method in accordance with the present invention is a new method of producing a transparent electroconductive coating of excellent uniformity under automatic control.

EXAMPLE 11

The same black electroconductive film obtained under the same conditions as in Example 9 and having the same properties as the coating obtained in Example 9 was immersed in aqueous solutions of various oxidizing agents indicated in Table 8 to oxidize the coating of the lower oxides of indium metal chemically. The properties of the resulting transparent electroconductive coatings are shown in Table 8.

Table 8

| Oxidizing agent | Chemical oxidation conditions | | | | Properties of the transparent electroconductive coating | |
|---|---|---|---|---|---|---|
| | Concentration (wt.%) | pH | Temperature (°C) | Oxidation time | Surface resistance (ohms/cm$^2$) | Transmittance (%) |
| Aqueous solution of potassium permanganate acidified with H$_2$SO$_4$ | 1.6 | 1.9 | 25 | 3 seconds | 2,000 | 80–85 |
| Aqueous solution of potassium bichromate acidified with H$_2$SO$_4$ | 1.0 | 1.0 | 25 | 7.5 seconds | 6,000 | 80–85 |
| Aqueous solution of persulfuric acid | 5.8 | 2.9 | 25 | 20–30 minutes | 7,000 | 75–85 |

It is seen from Table 8 that since the chemical oxidation method in accordance with the present invention can be performed at room temperature, it can be fully applied to plastics of low thermal stability.

EXAMPLE 12

Indic oxide was vacuum deposited on the surface of a 3 mm thick sheet of polycarbonate, polypropylene, poly(methyl methacrylate) and polystyrene under the same conditions as in Example 10 to form a coating having similar properties.

The sheet having the black electroconductive coating so formed was immersed in an aqeuous solution containing the various oxidizing agents indicated in Table 9 to chemically oxidize the coating of the lower oxides of indium. The properties of the resulting coatings are also shown in Table 9.

Table 9

| Base | Chemical oxidation conditions | | | Properties of the transparent electroconductive coating | |
|---|---|---|---|---|---|
| | Species and concentration of the oxidizing agent | Temperature (°C) | Oxidizing time | Surface resistance (ohms/cm$^2$) | Transmittance (%) |
| Polycarbonate | Aqueous solution of potassium manganate acidified with H$_2$SO$_4$ (1.6 wt.% (pH=2.7)) | 25 | 10 seconds | 900 | 70–75 |
| Polypropylene | Aqueous solution of persulfuric acid (10 wt.%) | 50 | 3.5 minutes | 3,500 | 75–80 |
| Poly(methyl methacrylate) | Aqueous solution of potassium bichromate (1.0 wt.%) | 25 | 5 minutes | 2,500 | 75–80 |
| Polystyrene | Aqueous solution of potassium permanganate (1.6 wt.%) | 25 | 3 minutes | 1,200 | 70–80 |

It is clearly seen from Table 9 that according to the chemical oxidation method in accordance with the present invention, a transparent electroconductive coating can be formed on the surface of ordinary versatile plastics of relatively low heat resistance temperature.

For comparison, a coating of indium metal with a thickness of 1,000 A., was formed by vacuum evaporation on a film of polyethylene terephthalate, and without further treatment, the film was immersed in an aqueous solution of the oxidizing agent mentioned above. The surface was dissolved partly, and became an electroconductive film which was apparently transparent with considerable non-uniformity in transparency.

EXAMPLE 13

Indic oxide was vacuum evaporated and deposited on the surface of a 50 μm thick polyethylene naphthalate film which had been biaxially stretched and heat-treated at 230°C., in the same way as in Example 9. Similarly, indic oxide containing 5 percent of tin oxide was vacuum evaporated. In either case, there was obtained a black electroconductive coating of the lower oxides having a thickness of about 2,000 A to 3,000 A.

The film containing the coating so formed was heat-treated under constant length in air at 200°C. for as long as 1.5 hours. There was obtained a coating of insufficient transparency as shown in Table 10.

The semi-transparent electroconductive coating so obtained was then exposed to hydrogen chloride, chlorine gas, and vapor of aqua regia respectively, washed with water and dried. As a result, there could be obtained a transparent electroconductive coating having excellent transparency as shown in Table 10.

form a black coating of the lower oxides of indium having a thickness of about 500 A. The film having the coating so formed was heat-treated in air at 200°C. under constant length. The relation between the treating time and the properties of the treated coating was determined, and shown in Table 12.

Table 12

| Heat-treating time (minutes) | 0 | 5 | 10 | 15 | 20 |
|---|---|---|---|---|---|
| Transmittance (%) | 43 | 72 | 79 | 83 | 90 |
| Surface resistance (ohms/cm²) | 960 | 1040 | 1250 | 1350 | 1500 |

When the film having the coating was heat-treated for 10 minutes, 15 minutes and 20 minutes respec- Table 10

| Treating agent | Coating of the lower oxides of indium | | | | | Coating of the lower oxides of indium containing a tiny amount of tin | | | | |
|---|---|---|---|---|---|---|---|---|---|---|
| | Before chlorination | | | After chlorination | | Before chlorination | | | After chlorination | |
| | Surface resistance (ohms/cm²) | Transmittance* (%) | Treating time | Surface resistance (ohms/cm²) | Transmittance (%) | Surface resistance (ohms/cm²) | Transmittance (%) | Treating time | Surface resistance (ohms/cm²) | Transmittance (%) |
| Hydrogen chloride | 450 | 88 | 11 seconds | 1.6 k | 98 | 135 | 68 | 1 minutes | 630 | 94 |
| Chlorine gas | 300 | 57 | 10 minutes | 2.8 k | 95 | — | — | — | — | — |
| Vapor of aqua regia | 120 | 48 | 13 seconds | 3 k | 92 | 120 | 65 | 57 seconds | 660 | 93 |

*Transmittance for light having a wavelength of 600 nm

As is seen from the table, the chlorination treatment was performed within very short periods of time, and especially when tin is added, there was obtained a coating having excellent transparency and electric conductivity.

EXAMPLE 14

The coating obtained in the same way as in Example 9 was immersed in an aqueous hydrochloric acid solution having a concentration of 2, 10 and 35 percent respectively, and there was obtained a transparent electroconductive coating of sufficiently improved transparency as shown in Table 11 below. In this case also, the chlorination treatment was performed within relatively short periods of time, and by choosing a suitable concentration, there can be obtained a transparent electroconductive coating of superior properties.

tively, and then exposed to hydrogen chloride gas for about 10 seconds, followed by washing with water and drying, there was obtained a coating having the properties shown in Table 13.

Table 13

| Heat-treating time (minutes) Properties of the coating | 10 | 15 | 20 |
|---|---|---|---|
| Transmittance (%) | 94 | 94.5 | 97 |
| Surface resistance (ohms/cm²) | 2200 | 1900 | 1600 |

It is clear from Table 13 that even when the coating is relatively thin, its transparency can be greatly improved without significantly impairing its surface resistance by carrying out the heat-oxidation for the same Table 11

| Treating agent | Coating of the lower oxide of indium | | | | | Coating of the lower oxides of indium containing a tiny amount of tin | | | | |
|---|---|---|---|---|---|---|---|---|---|---|
| | Before chlorination | | | After chlorination | | Before chlorination | | | After chlorination | |
| | Surface resistance (ohms/cm²) | Transmittance (%) | Treating time | Surface resistance (ohms/cm²) | Transmittance (%) | Surface resistance (ohms/cm²) | Transmittance (%) | Treating time | Surface resistance (ohms/cm²) | Transmittance (%) |
| 2% hydrochloric acid | 165 | 34 | 4 minutes | 8.7 k | 90 | 100 | 55 | 20 minutes | 3.4 k | 90 |
| 10% hydrochloric acid | 140 | 33 | 20 seconds | 100 k | 95 | 70 | 55 | 17 seconds | 550 k | 90 |
| 35% hydrochloric acid | 340 | 61 | 19 seconds | 3 k | 90 | 215 | 73 | 8 seconds | 4.1 k | 95 |

EXAMPLE 15

Indic oxide was vacuum evaporated and deposited on the surface of a 75 mm thick polyethylene terephthalate film under the same conditions as in Example 1 to period of time. When the heat-treating time is shortened to half, the transparency increases and the surface resistance increases by only 700 ohms. From this, it can be concluded that the process of the present invention exhibits great effects in shortening the heat-treating time.

What we claim is:

1. A method for preparing a transparent electrically conductive article which comprises forming a gray to black color coating of lower oxides of indium on the surface of a plastic material by vacuum evaporation using indic oxide as an evaporating source at a pressure lower than $5 \times 10^{-4}$ mmHg while maintaining the temperature of the evaporating source at 1,300° to 2,000°C., and thereafter oxidizing said coating until the coating becomes transparent so that the transmittance of 600 nonameters light through the coating reaches 60 to 95 percent.

2. The method of claim 1 wherein the temperature of the evaporating source is 1,450° to 1,800°C.

3. The method of claim 1 wherein said oxidation treatment comprises heating the coating formed by vacuum evaporation in an atmosphere of air or a gas containing at least 15 percent by volume of oxygen at a temperature of 80° to 250°C. but lower than the heat-resistance temperature of the plastic material.

4. The method of claim 3 wherein the coating has a thickness of 300 to 2000 A.

5. The method of claim 1 wherein said oxidation treatment comprises subjecting the coating formed by vacuum evaporation to anodic oxidation in a liquid medium having a specific conductivity of from $10^{-10}$ ohm$^{-1}$ cm$^{-1}$ to $10^{-2}$ ohm$^{-1}$ cm$^{-1}$.

6. The method of claim 5 wherein the liquid medium has a specific conductivity of from $10^{-9}$ ohm$^{-1}$ cm$^{-1}$ to $10^{-3}$ ohm$^{-1}$ cm$^{-1}$.

7. The method of claim 6 wherein the liquid medium is dimethyl sulfoxide or dimethyl formamide.

8. The method of claim 1 wherein said oxidation treatment comprises contacting the coating formed by vacuum evaporation with an aqueous solution having a pH within the range of 1 to 13 containing at least one inorganic chemical oxidizing agent.

9. The method of claim 8 wherein said inorganic chemical oxidizing agent is a permanganate, bichromate or persulfate.

10. The method of claim 8 wherein said aqueous solution has a pH within the range of 2 to 12.

11. The method of claim 1 wherein the coating which has been subjected to oxidation is then contacted with a chlorinating agent at about room temperature for about 3 seconds to about 30 minutes, said chlorinating agent being selected from the group consisting of chlorine, hydrogen chloride, nitrogen oxychloride, diluted hydrochloric acid or aqua regia.

12. The method of claim 1 wherein said evaporating source consists of at least 80 percent by weight of indic oxide and the remainder being tin oxide or lower oxides of indium.

13. The method of claim 1 wherein said plastic material is a film or sheet.

14. The method of claim 1 wherein said plastic material is a polyester.

15. The method of claim 1 wherein the plastic material is a polyester film, wherein at least 80 mol percent of the recurring units of said polyester consists of polyethylene-2,6-naphthalene dicarboxylate; said film having been biaxially stretched wherein the draw ratio in each of the transverse and longitudinal directions is at least 2.

* * * * *